United States Patent
Koubenski et al.

(10) Patent No.: US 7,171,400 B2
(45) Date of Patent: Jan. 30, 2007

(54) INHERITANCE AND RELATIONSHIP TO DIRECTORY INFORMATION IN AN E-COMMERCE APPLICATION

(75) Inventors: Dmitri Koubenski, Cupertino, CA (US); Stayton D. Addison, Jr., San Jose, CA (US); Daniel Kuokka, Palo Alto, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 786 days.

(21) Appl. No.: 09/969,634

(22) Filed: Oct. 4, 2001

(65) Prior Publication Data

US 2003/0069736 A1 Apr. 10, 2003

(51) Int. Cl.
G06F 7/00 (2006.01)
G06F 17/30 (2006.01)

(52) U.S. Cl. ............................................ 707/3; 705/14
(58) Field of Classification Search ................... 705/14; 707/3
See application file for complete search history.

(56) References Cited

U.S. PATENT DOCUMENTS

| | | | | |
|---|---|---|---|---|
| 5,058,033 | A * | 10/1991 | Bonissone et al. | 706/52 |
| 5,297,150 | A * | 3/1994 | Clark | 714/26 |
| 5,907,844 | A * | 5/1999 | Guay et al. | 707/100 |
| 6,675,261 | B2 * | 1/2004 | Shandony | 711/121 |
| 6,748,365 | B1 * | 6/2004 | Quinlan et al. | 705/14 |
| 6,757,673 | B2 * | 6/2004 | Makus et al. | 707/3 |
| 2001/0034694 | A1 * | 10/2001 | Elias | 705/37 |
| 2002/0152293 | A1 * | 10/2002 | Hahn et al. | 709/223 |
| 2002/0165701 | A1 * | 11/2002 | Lichtenberg et al. | 703/7 |
| 2003/0220926 | A1 * | 11/2003 | Huelsman et al. | 707/100 |
| 2003/0229540 | A1 * | 12/2003 | Algiene | 705/14 |

FOREIGN PATENT DOCUMENTS

| | | | |
|---|---|---|---|
| GB | 2354092 A | * | 4/2001 |
| KR | 2001002510 | * | 1/2001 |

OTHER PUBLICATIONS

Zonglin et al, Rule Mining with Prior Knowledge—A Belief Networks Approach, Jan. 10, 2001, Intelligent Data Analysis, vol. 5, Issue 2, beginning at p. 95.*
Suh, Yung-Ho, Verification of Rules in Rule-Based Systems: A Tree Based Approach, 1990, Dissertations Abstracts International, vol. 5104A, beginning at p. 1306.*
Jajodia et al, Flexible Support for Multiple Access Control Policies, Jun. 2001, ACM Transactions on Database Systems, vol. 26, Issue 2, beginning at p. 214.*
Jajodia et al, A Flexible Authorization Mechanism for Relational Data Management Systems, Apr. 1999, ACM Transactions on Information Systems, vol. 17, Issue 2, beginning at p. 101.*

* cited by examiner

*Primary Examiner*—Ella Colbert
*Assistant Examiner*—James M. Alpert
(74) *Attorney, Agent, or Firm*—Michael C. Martensen; William J. Kubida; Hogan & Hartson LLP

(57) ABSTRACT

A system and method for dynamically determining a set of relevant rule instances based on a set of context attribute values comprising a directory server, an attribute data store, and a rules engine. The directory server includes rule instances having hierarchical structure. The attribute data store has a hierarchical structure and is configured to provide a set of hierarchically relevant context attribute values optimized from the rule instances, based on the set of context attribute values. The rules engine is configured to provide the set of context attribute values to the attribute data store in accordance with the context from the context provider, and to determine a set of relevant rule instances, based on the hierarchically relevant context attribute values from the attribute data store.

11 Claims, 7 Drawing Sheets

INHERITANCE AND RELATIONSHIP TO DIRECTORY INFORMATION IN AN E-COMMERCE APPLICATION

BACKGROUND OF THE INVENTION

1. Field of the Invention

The present invention relates to a system and method for dynamically and efficiently specifying and determining a set of relevant rule instances in an application context with hierarchical data with implied inheritance, and more particularly to a system and method for dynamically determining a set of relevant rule for a general class of e-commerce applications.

2. Discussion of the Related Art

A number of conventional systems and methods are available for determining a value for a rule instance applicable to a data context. These systems, may use implicit techniques, such as selecting the simplest rule or the highest priority rule. However, these systems and methods have shortcomings. They may not give the maintainer full control over rule selection, they may not support applications with hierarchical data, and they may not provide for a robust inheritance model.

Due to these limitations, conventional rules systems have not been applied successfully to e-commerce and other applications, where the selection of the rule and behavior of the system may be very predictable. The hierarchical rules engine disclosed herein may alleviate these problems by giving the maintainer a powerful, hierarchical model in which to define rules and their applicability with clear control.

SUMMARY OF THE INVENTION

Accordingly, a hierarchical rule determination system and method is disclosed that obviates one or more of the problems due to limitations and disadvantages of the related art.

In one embodiment, a system and method is disclosed for dynamically determining a set of relevant rule instances, also known as rules, given on a set of context attribute values from a hierarchically-specified rule data store specifying inheritance relationships, also known as the rule base or attribute data store and using conflict resolution that is consistent with the inheritance principles. The system comprises a context provider, an attribute data store, and a rules engine. The context provider provides the dynamic data state of the application comprising an application configuration parameter, or the desired output from the rule system, and the set of context attribute values, or the inputs to the system. The data store is a repository of rules instances triggered by applicability conditions specified in terms of the hierarchical domains of the context attribute values. This allows the system administrator to clearly specify rule instances to be used in specific conditions. The rules engine receives a context from the context provider, examines the attribute data store to determine the appropriate hierarchically relevant rule instance, possibly using a set of hierarchically consistent conflict resolution strategies, and returns to the context provider the appropriate value for the application configuration parameter.

Additional features and advantages of the preferred embodiments will be set forth in the description which follows, and in part will be apparent from the description, or may be learned by practice of the invention. The advantages of the invention will be realized and attained by the structure and method particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
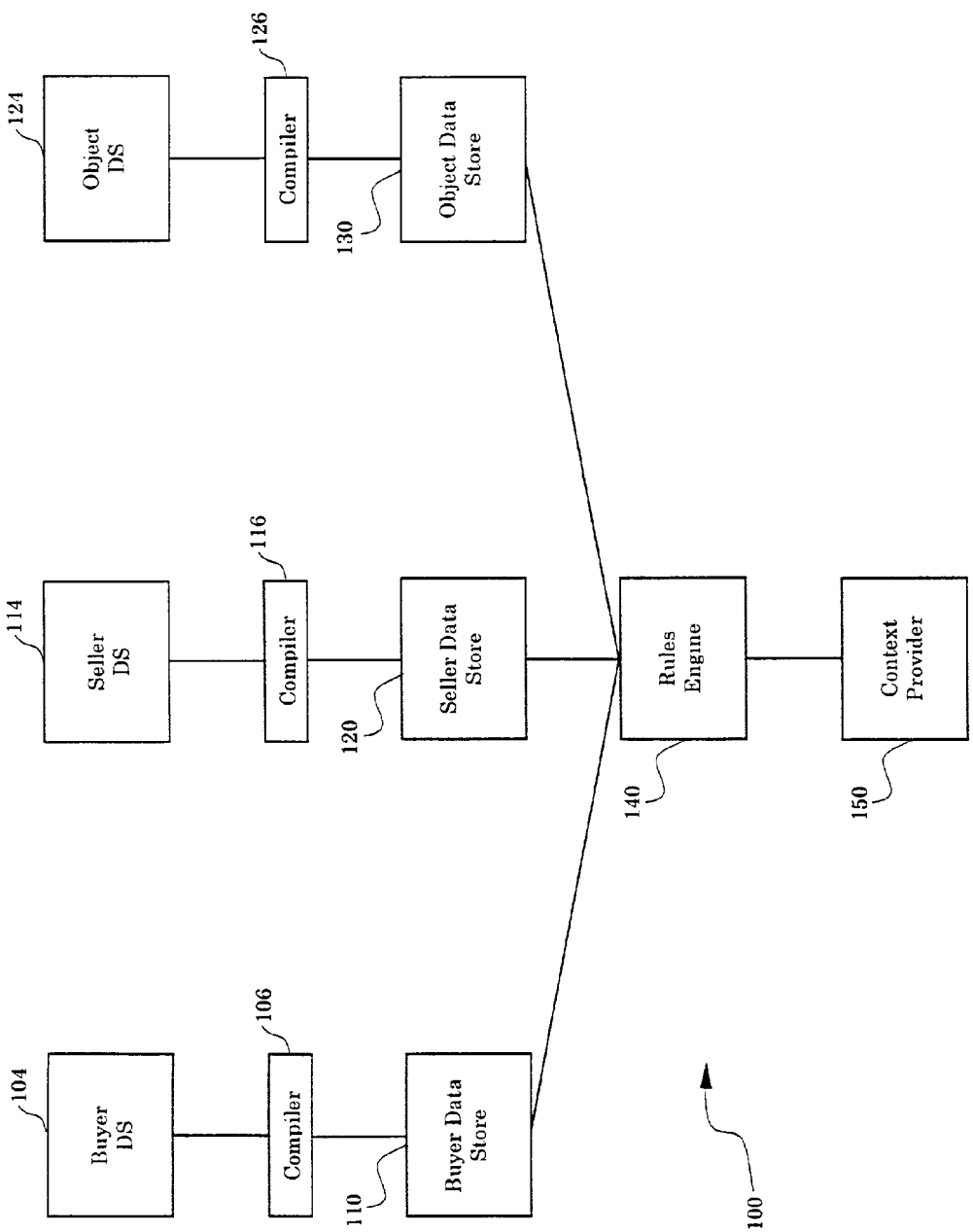
FIG. 1 illustrates a block diagram of a dynamic rule determination system in accordance with an embodiment of the present invention.

Reference will now be made in detail to a first embodiment of the present invention, examples of which are illustrated in the drawings.

According to one embodiment, the hierarchical rule determination system determines a rule instance for a received context. For example, the hierarchical rule determination system may determine a discount and name for an item based on a received context, wherein the context includes a buyer identity, a seller identity, and an item identity. The name also may be known as an application configuration parameter. To implement this and other functions, hierarchical rule determination system 100 may be configured as depicted in FIG. 1. In this embodiment, hierarchical rule determination system 100 comprises an application data store, or rule base, with a plurality of hierarchies. Allowable values for certain roles may be heterogeneous and may exist in a hierarchy. For the purpose of providing an example by which to explain the present invention, three instances of hierarchies have been selected: buyer data store hierarchy 110, seller data store hierarchy 120, and object data store hierarchy 130. Data stores hierarchies 110, 120, and 130 have been optimized, as disclosed below. It is understood that different instances of data store hierarchies and different numbers of data store hierarchies may be used. Additionally, dynamic rule determination system 100 includes rules engine 140 and context provider 150.

For example, the buyer role of the rule instance may be set to a company, such as AOL, a subsidiary, such as Netscape, a division, such as APP, or user. By setting the role to a company, the implication is that all parts of that company also may be specified. Other roles that may likely use a hierarchy include product, seller, or location.

The information about the hierarchy is specified external to rules engine 140. Preferably, hierarchy information is stored in a directory server, such as buyer directory server 104. For efficient processing of rules subject to the combinations of inheritance, the inheritance trees may be directed acyclic graphs ("DAGs") that are translated and compiled by compiler 106 into a rules engine data store, such as buyer data store 110. Buyer data store 110 may be an optimized hierarchy of the hierarchical relationships defined in buyer directory server 104. Compiler 106 may be a plug-in to directory server 104 or a separate service. Each data store is an optimized hierarchy for its respective directory server. For example, seller directory server 114 includes hierarchies for sellers that are compiled by compiler 116 into seller data store 120. Further, object directory server 124 includes hierarchies for objects that are compiled by compiler 126 into object data store 130.

The translation portion of the present invention provides the specification of how inheritance is to be computed. For example, in the directory servers there may be relations such as own-by, member-of, and perhaps other installation specific relations. Moreover, depending on how the administrator sets up the directory servers, the semantics of these relations may differ from other installations. A translation configuration file may be used to specify exact relations to be included in the inheritance tree for any given role. These relations may possibly be further constrained by contextual information such as the object types participating in the relation in the surrounding relations.

Thus, directory servers 104, 114, and 124 also may be data stores comprising master source data. Preferably, directory servers 104, 114, and 124 are relational data bases storing hierarchical information.

Each of these directory server hierarchies, or an arbitrary subset of the data store hierarchies (i.e., any sub-tree), may be managed by operationally independent organizations, such as a service-provider organization and a client organization. Additionally, each of these directory server hierarchies may be managed by an organization approved by the buyer and seller to manage rule instances.

Figure 2A:
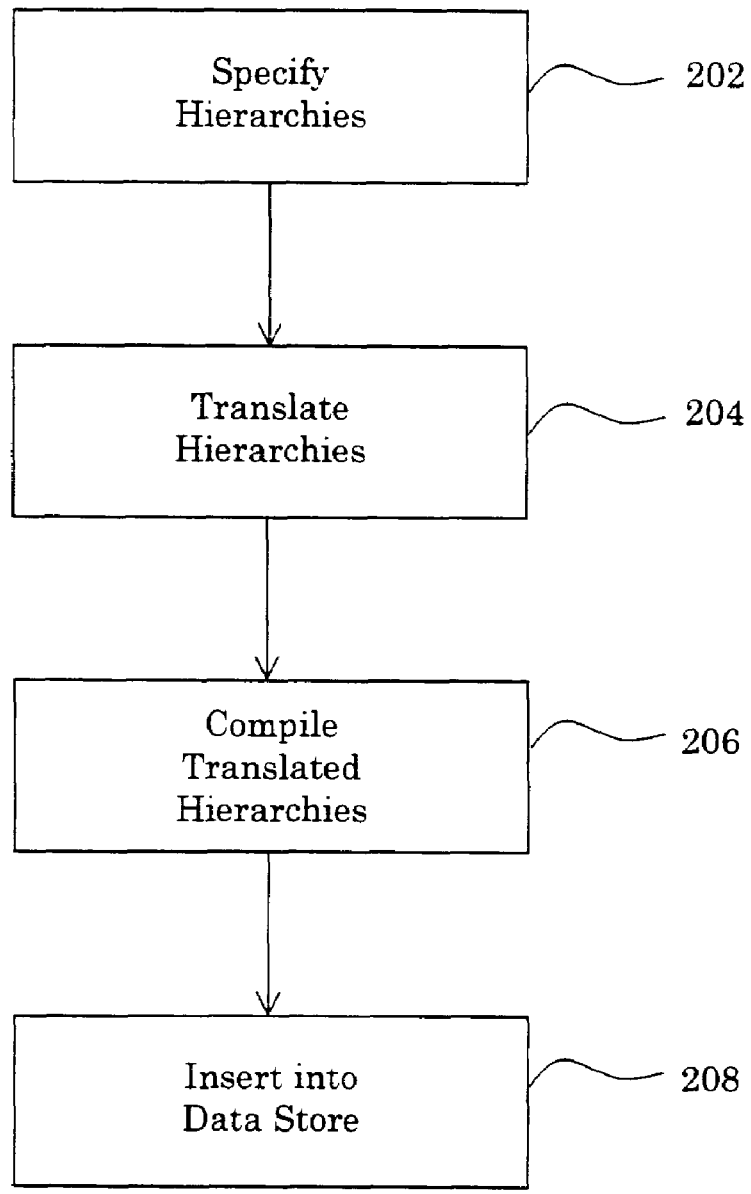
FIG. 2A illustrates a flowchart for incorporating a hierarchy from a directory server to a data store in accordance with an embodiment of the present invention.
Figure 2B:
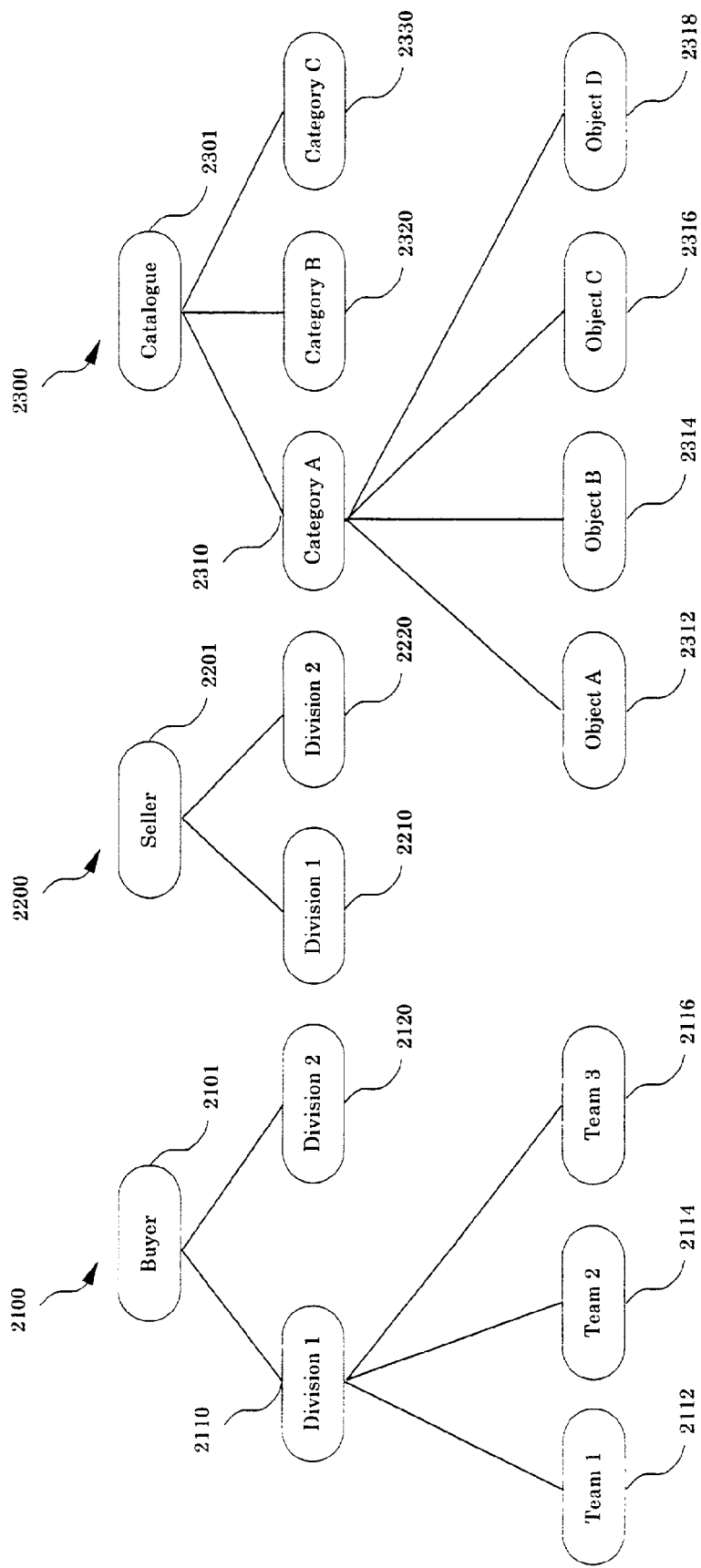
FIG. 2B illustrates a diagram of three hierarchical data stores, a buyer tree, a seller tree, and an object tree with operational identifiers.
Figure 3:
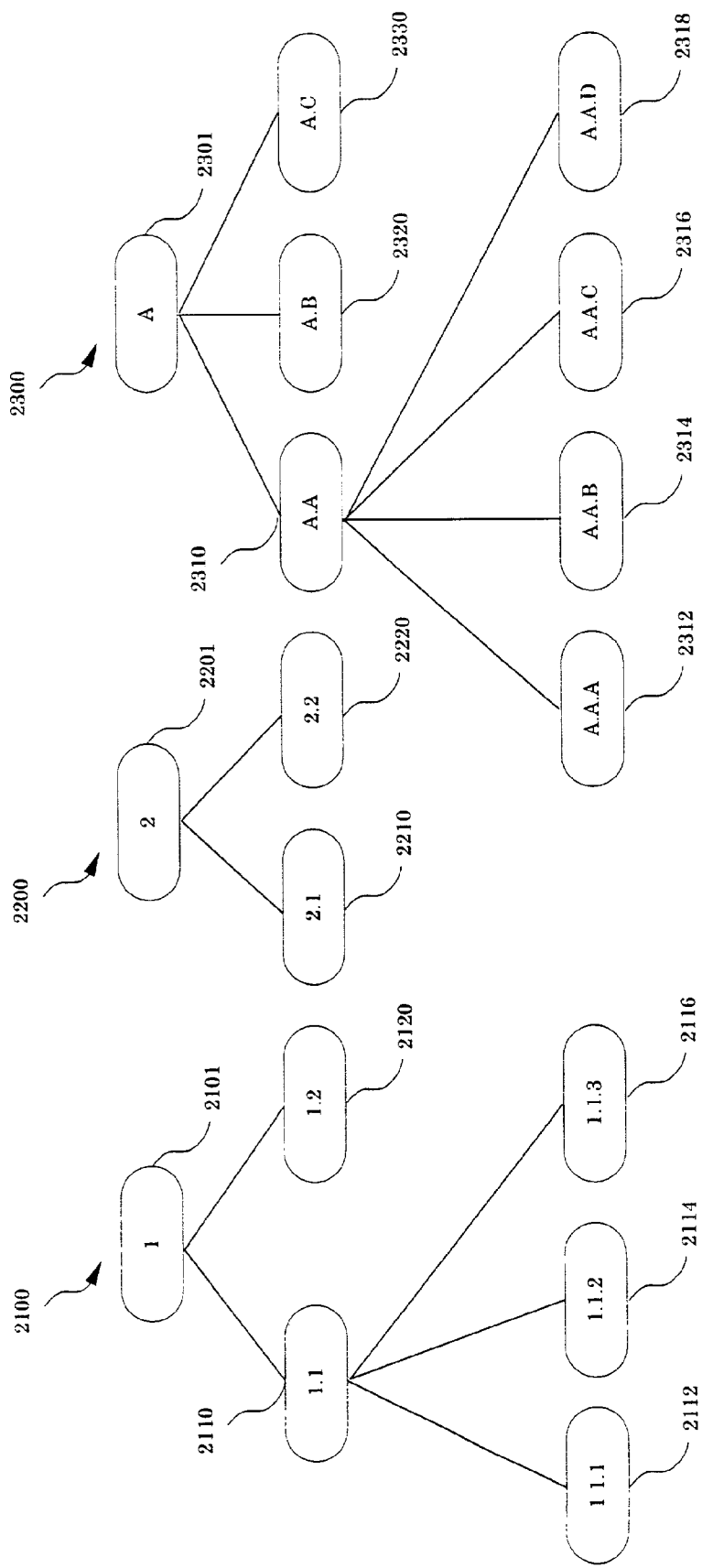
FIG. 3 illustrates a diagram of three generalized data stores according to an embodiment of the present invention.

Data store hierarchies 110, 120, and 130, alternatively referred to as attribute data store, or rule base, comprise hierarchically structured data stores as depicted in FIGS. 2 and 3. In one embodiment, data store hierarchies 110, 120, and 130 are configured to represent optimally the set of context attribute values that may comprise a buyer identity, a seller identity, and an item identity. Based on these received context attributes, data store hierarchies 110, 120, and 130 may be used by rules engine 140 to determine a set of hierarchically relevant context attribute values. For example, as disclosed in greater detail below, if a first context attribute value is received, rules engine 140 may examine the data store to determine the ancestors of the received context attribute value, determine the applicable rule instance, and provide a hierarchically relevant application configuration parameter, or name, to context provider 150.

Rules engine 140 is configured to receive a context from a context provider, such as context provider 150 shown in FIG. 1. Additionally, rules engine 140 examines the data store to determine the applicable rule instance based on the received values. For example, rules engine 140 receives a buyer context attribute value existing within the buyer data store hierarchy 110, a seller context attribute value existing within seller data store hierarchy 120, and an object, or product, context attribute value within object data store 130. Furthermore, rules engine 140 is configured to receive a set of hierarchically relevant context attribute values from attribute data stores 110, 120, and 130 based on the context attribute values provided thereto. Rules engine 140 additionally is configured to determine a set of relevant rule instances, based on the hierarchically relevant context attribute values from the attribute data store.

Context provider 150 may comprise an application, process, service, or other resource that provides a context. In one embodiment, context provider 150 also may receive an ACP value from the rules engine 140 based on the provided context. In one embodiment, context provider 150 comprises an electronic commerce application. Context provider 150 and rules engine 140 may be physically remote or may be co-located. Rules engine 140 and context provider 150 also may be implemented on a single machine. The communication paths between each of the components of FIG. 1 may be any suitable physical or logical communication channels, paths, or methods, including a system bus, a network connection, and a wireless connection.

FIG. 2A depicts a flowchart for incorporating a hierarchy from a directory server to a data store in accordance with an embodiment of the present invention. As noted above, a directory server may contain information about a hierarchy that is specified external to a rules engine. Step 202 executes by specifying the hierarchies. The hierarchies may be specified by using inheritance trees that detail parts of specific roles. The inheritance trees may be directed acyclic graphs. Step 204 executes by translating the hierarchies represented by the inheritance trees. This step may provide the formal specification of how inheritance is to be computed. A translation configuration file may be used to specify exactly those relations that should be included in an inheritance tree in any given role. Step 206 executes by compiling the translated hierarchies. The hierarchies may be compiled with a compiler or other program in communication with the directory server. Compiled hierarchies are optimized hierarchies that are easily readable by the rules engine. Step 208 executes by inserting the compiled hierarchies into a data store that corresponds with the role of directory server. Thus, the data store also may include hierarchies like the directory server. However, the hierarchies in the data store may be optimal for use by rules engine and in conflict resolution operations.

FIG. 2B depicts a diagram of a buyer tree, a seller tree, and an object tree with operational identifiers of the present invention that are contained within the respective data stores in accordance with an embodiment. Specifically, FIG. 2B depicts buyer organization chart 2100, seller organization chart 2200, and object catalogue 2300. Trees 2100, 2200 and 2300 may be represented, for example, in an LDAP server, in a relational database, an XML document, or in another type of hierarchical data structure. Additionally, trees 2100, 2200 and 2300 may be generated dynamically when a context is received by rules engine 140.

For example, buyer organization chart 2100 depicts an organization for Buyer 2101. Buyer 2101 has two divisions, Division (1) 2110 and Division (2) 2120. Division (1) 2110 has three teams 2112, 2114, and 2116. Additionally, some or all of the teams may have individuals associated with the team (not shown). Similarly, Division (2) 2120 may have additional teams, individuals, or other nodes and/or leafs (not shown). In one embodiment, buyer organization chart 2100 is managed entirely by Buyer 2101, such that a system receives updates to buyer organization chart 2100 from Buyer 2101. Similarly, seller organization chart 2200 is managed entirely by Seller 2201, such that a system receives updates to seller organization chart 2100 from Seller 2201. Additionally, object catalogue 2300 may be managed by Seller 2200. However, as noted above, object catalogue 2300 may be managed by an organization other than Seller 2200.

A context between a buyer and a seller for a particular object may invoke one or more hierarchically broader rule instances. Rule instances may represent agreements made between a buyer and seller relating to an object, access rights provided by an administrator, or a type of sale. For example, rule instance may establish a rebate available to a buyer when a particular object is purchased from a seller. Because buyers, sellers, and objects may have several nodes and leaves as depicted in FIG. 2, rule instances may be created and managed for some or all of these nodes and leaves in accordance with the present invention.

The rule instance data store may be stored in rules engine 140. Additionally, the rule instance data store may be stored elsewhere in system 100 and transmitted to rules engine 140 when a context is received. Dynamic rule determination system 100 may contain a plurality of rules relating to different context attribute combinations. The rules should be reflected in the directory servers 104, 114, and 124. For example, organization 1 may have rule instances established with organizations 2 and 3, and organization 2 may have rule instances established with organizations 1, 3, and 4.

A context may invoke rule instances matching the context, and one or more hierarchically broader rule instances. In one embodiment, all matching and hierarchically broader rule instances may apply to a received context. For example, a context between Team (1) 2112 and Division (2) 2220 for Object (C) 2316 may invoke a hierarchically broader rule instance between Division (1) 2110 and Division (2) 2220 for any object in Category (A) 2310. The broadest rule instance for the hierarchies depicted in FIG. 2 is between Buyer 2101, Seller 2200, and Catalogue 2300.

FIG. 3 depicts a block diagram of a buyer tree, a seller tree, and an object tree with unique identifiers in accordance with an embodiment of the present invention. These trees may be modified in structure and number, and the entities represented by the trees may be modified as well. Each organization may have a global unique identifier within the system. These unique identifiers may be managed by the manager of rules engine 140, by a third party, such as Data Universal Numbering System ("DUNS"), by a combination thereof, or by any method that uniquely identifies an organization. The system also may associate a unique identifier with organizations other than individual companies, such as associations, joint ventures, all buyers (e.g., a unique identifier to indicate that a rule is relevant to all buyers), or other organizations. Additionally, each operational limit of an organization may be assigned a local unique identifier which may be used in conjunction with unique identifier of the organization. Similarly, objects in object catalogue 2300 preferably have unique identifiers that identify the object independent of the company that makes the product and/or provides the service. Examples of such unique identifiers are Universal Product Codes ("UPC") and International Standard Book Numbers ("ISBN"). Additionally, the system may create its own unique identification system, as depicted in FIG. 3.

Figure 4:
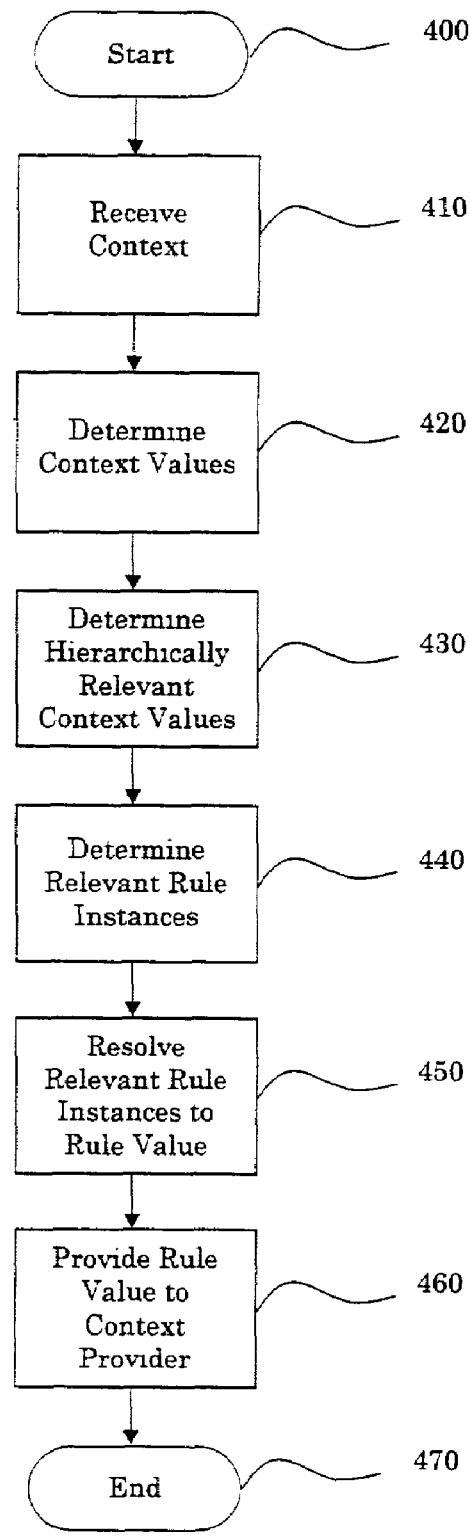
FIG. 4 illustrates a flowchart for dynamic rule determination in accordance with an embodiment of the present invention.

FIG. 4 depicts a flowchart of a dynamic pricing method in accordance with an embodiment of the present invention. In overview, the process is initiated at step 400. At step 410, a context is received. At step 420, the rules engine determines context values for the received context. At step 430, the rules engine determines hierarchically relevant context values for the received context by examining the hierarchies in the data store. At step 440, the rules engine determines relevant rule instances by examining the data store. At step 450, the rules engine resolves relevant rule instances to a rule value. At step 460, the rules engine provides the rule value to the context provider. The process terminates at step 470. Each of these steps is described in greater detail below.

At step 410, a context is received. This context may be received by the rules engine. In one embodiment, the rules engine receives a context from an electronic commerce application. For example, returning to the example of a system comprising a buyer, seller and object data store, the rules engine may receive a context comprising an application configuration parameter, a buyer attribute, a seller attribute, and an object attribute. This context could be generated when a buyer has requested an object from a seller. For example, a member of Team 1 from Division 1 of Buyer may be purchasing one Object (e.g., A.A.C) from Division 1 of Seller. This transaction may be represented by the context Buyer==1.1.1&Seller==2.1&Object==A.A.C==>Discount.

In one embodiment, the received context may include other information. For example, the context may include a number of objects involved in the context, an aggregate value of objects, a combination thereof, or other information. This other information may comprise a fixed quantity, such as 100, or a determinable quantity, such as 100 objects if the cost per object is $100 or greater, 200 objects if the cost per object is less than $100. For an example of a possible physical and/or logical structure of a received context, see received context 650 of FIG. 6. A context may be received as a recordset, an XML document, or by other data communication methodology.

At step 420, the rules engine determines context values for the received context. Using the above example, the rules engine may determine that the attributes for the context Buyer==1.1.1&Seller==2.1&Object==A.A.C==>Discount are are '1.1.1,' '2.1,' 'A.A.C,' and 'Discount' for buyer, seller, object, and ACP, respectively.

These context attribute values are compared to their respective data store hierarchies at step 430 in order to determine hierarchically relevant context values for the received context. For example, as shown in FIG. 3, 1.1.1 is a leaf of node 1.1, and 1.1 is a leaf of node 1. Accordingly, buyer data store hierarchy 110 and rules engine 140 may determine that 1.1.1, 1.1 and 1 are hierarchically relevant context values. In addition to determining the buyer, seller, and object identities, the rules engine may determine other context parameters that are used in determining an ACP value, such as an object base price.

At step 440, the rules engine determines relevant rule instances. In one embodiment, all matching and hierarchically broader rule instances are relevant rules. A hierarchically broader rule is any rule that has attribute values that are in the set of hierarchically relevant context values, as determined in step 430. In the present example, each of the following rules would be relevant as hierarchically broader rule instances:

1.1.1, 2.1, A.A.C=Received Context
1.1, 2.1, A.A.C=Broader (Parent of 1.1.1)
1, 2.1, A.A.C=Broader (Grandparent of 1.1.1)
1.1.1, 2, A.A.C=Broader (Parent of 2.1)
1.1.1, 2.1, A.A=Broader (Parent of A.A.C)

1, 2, A=Broadest Rule (Grandparent of 1.1.1 and A.A.C, Parent of 2.1) Additional, unlisted, hierarchically broader rules may exist. In addition to filtering rules based on hierarchically relevant context values, other parameters may be used. For example, if the context has an effective date value, the rules engine may filter out all those rules in which the received context does not satisfy the effective date criteria.

In one embodiment, all rule instances are stored in a rules data store that may be integral with or remote from rules engine 140. The rules data store may comprise a particular type of rule, such as a plurality of discount rules or comprise a plurality of different types of rules, such a plurality of discount rules, access rules, spending limit rules, or the like. In one embodiment, the rules engine may retrieve all rules relating to a relevant buyer and a relevant seller from a rules data store and perform additional rules analysis in memory, thereby reducing the number of database accesses.

Figure 6:
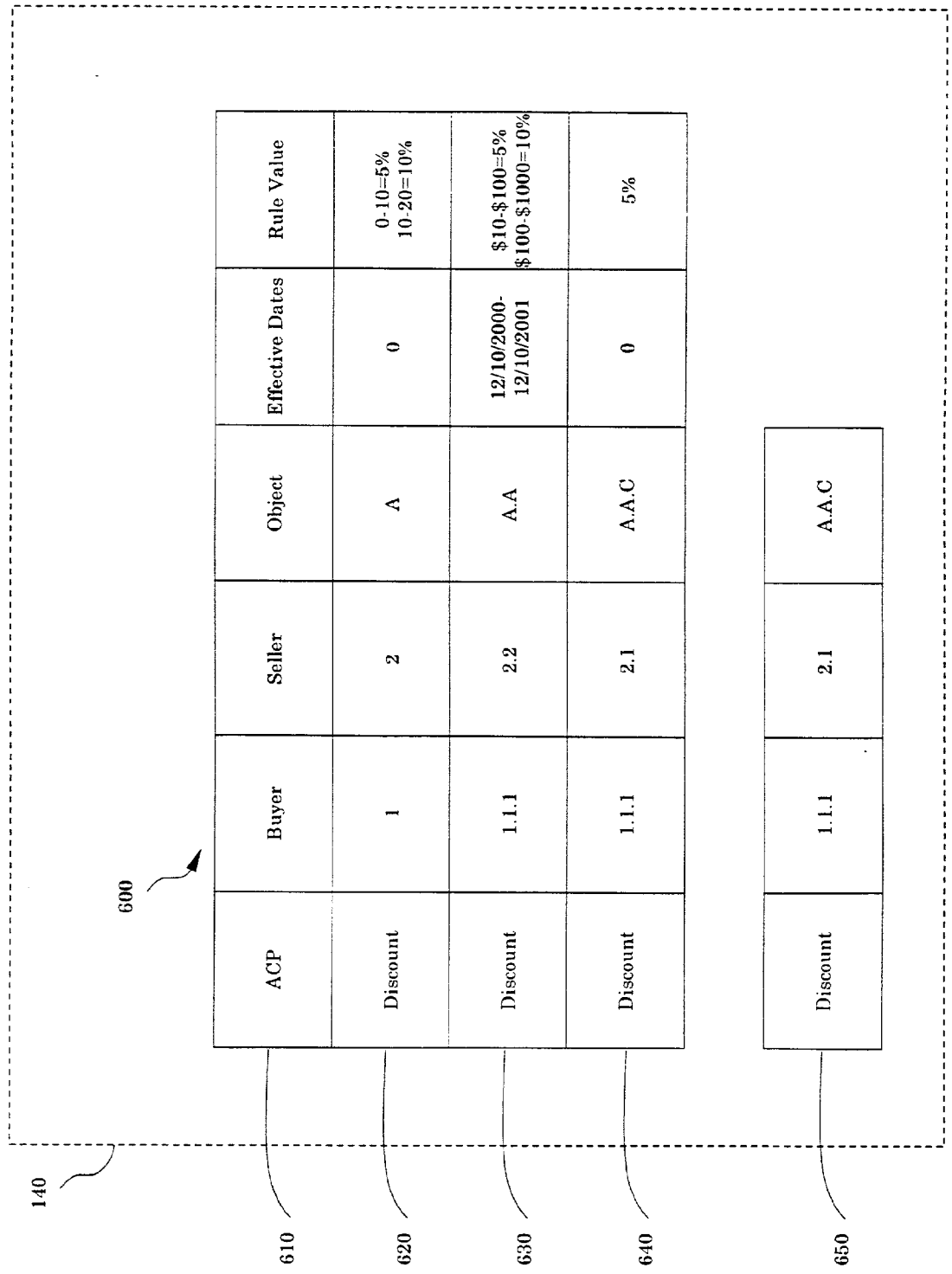
FIG. 6 illustrates a realization of a set of example rules specified in the data store in accordance with the present invention.

FIG. 6 provides an exemplary logical representation of rules data store 600 in accordance with an embodiment of the present invention. Rules data store 600 may comprise a plurality of rule instances 620, 630, and 640. These rules may identify the parameters by which a particular rule instance is determined to be relevant. For instance, using the example above, rule instances 620 and 640 may be relevant to received context 650, while rule instance 630 may be not relevant. Specifically, rule instance 640 is relevant because the received context buyer, seller, and object identity are equal to the rule instance 640 buyer, seller, and object identity. Rule instance 620 is relevant because rule 620 is a hierarchically broader rule than rule instance 640 (1 is the grandparent of 1.1.1, 2 is the parent of 2.1, and A is the grandparent of A.A.C). Rule instance 630 is irrelevant because rule instance 630 is not hierarchically broader than rule instance 640 (2.2 is the sibling of 2.1).

At step 450, the rules engine resolves relevant rule instances to a rule value. In one embodiment, this step may be implemented in accordance with the process disclosed in relation to FIG. 5 below.

At step 460, the rules engine provides the rule value to the context provider. For example, the rules engine may provide a discount to an electronic commerce application, an access approval indicator to an access control program, a winner to a complex auction program, or provide a rule value to another type of context provider. The rules engine may additionally perform other tasks, such as caching a rule value for a received context.

Figure 5:
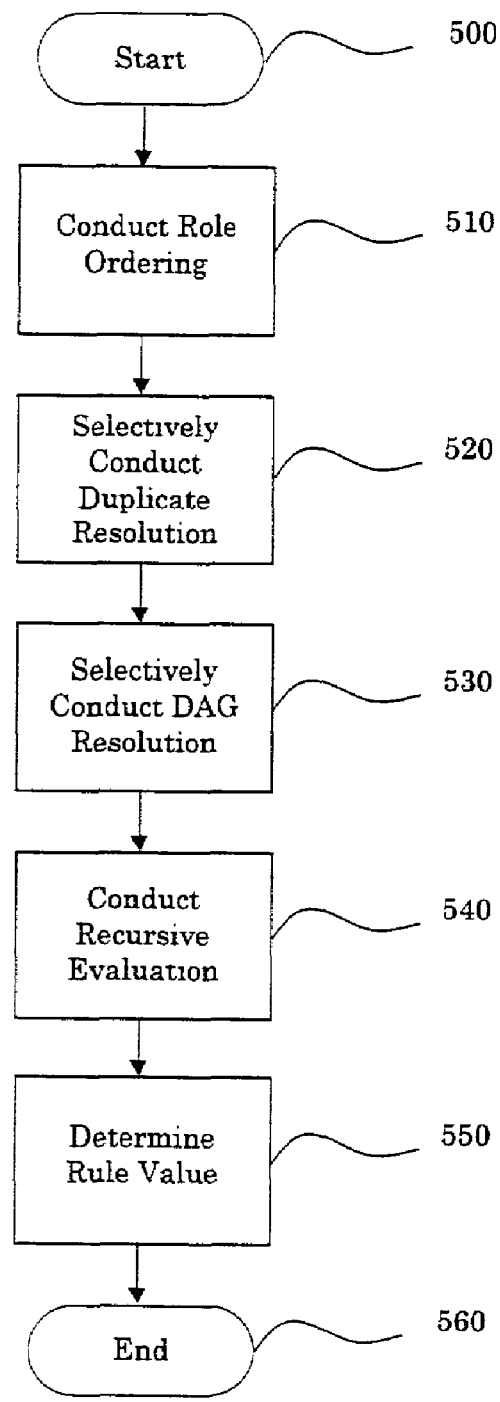
FIG. 5 illustrates a flowchart for the conflict resolution phase of the rules determination process in accordance with the present invention.

FIG. 5 depicts a flowchart for the conflict resolution phase of the rule determination process in accordance with an embodiment of the present invention. Specifically, FIG. 5 depicts a process in which the rules engine resolves multiple relevant rules to a single rule value. Specifically, the process is initiated at step 500. At step 510, the rules engine conducts role ordering based on static role ordering. At step 520, the rules engine selectively conducts duplicate resolution based on a duplicate resolution strategy. At step 530, the rules engine selectively conducts directed acyclic graph ("DAG") resolution based on a DAG conflict resolution strategy. At step 540, rules engine conducts recursive evaluation. At step 550, rules engine determines rule value. The process terminates at step 560.

At step 510, the rules engine conducts role ordering based on static role ordering. In one embodiment, there is a total ordering for roles for a given rule name. Conflicts between applicable rules may be resolved for the first role first. If there are multiple rules with identical values for the first role, then the second role will be used to resolve the conflict, and so on for subsequent roles. This resolves conflicts that cross inheritance trees. For example, assume there are two roles with the following ordering: buyer and product. Further assume these two rules:

Buyer=Netscape & Product=All=>Discount=5%
Buyer=Netscape & Product=Computers=>Discount= 10%

If a buyer within Netscape wants to purchase a computer, both rules apply. Because the first role (buyer) is identical for both rules, the conflict between rules will be resolved by the second role (product). If the first role (buyer) for the 5% rule had been APD, then that role would be used to resolve the conflict because buyer precedes product. Given the role ordering resolution phase, subsequent conflict resolution can occur within a single role, and therefore a single inheritance hierarchy.

At step 520, the rules engine selectively conducts duplicate resolution based on a duplicate resolution strategy. In one embodiment, if there are multiple rules with identical applicability conditions, then the conflict resolution algorithm may apply the duplicate resolution strategy associated with each rule globally.

For example, assume there are two rules as follows:
Product=Computers=>Discount=10%
Product=Computers=>Discount=5%

Because the applicability conditions of these rules is identical, there are duplicate values for discount which cannot be decided on the basis of the applicability conditions alone.

At step 530, the rules engine selectively conducts DAG resolution based on a DAG conflict resolution strategy. If the inheritance tree for a role is actually a DAG, then there is no clear ordering of rules specified for siblings. In this case, the conflict resolution algorithm will apply the DAG resolution strategy associated with each rule globally (i.e., with all instances of the rule). For example, assume there are two rules as follows:

Product=Computers=>Discount=10%
Product=DomesticItems=>Discount=5%

The received context relates to the purchase of a domestic computer. In this situation, there is no way to determine which rule should be preferred. For discounts, it is likely that the configuration parameter will be set to "unionm," and therefore all applicable rule values will be returned. The rules engine may be configured to take any action. In one embodiment, all discounts will be applied and some other limiting mechanism will be used to avoid excessive discounts such as maximum discount rule.

As another example, consider the following rules:
Buyer=Netscape/APD=>MaxPurchase=$100
Buyer=Netscape/Admins=>MaxPurchase=$100000

Further, assume that the buyer is organizationally in APD but also belongs to the Admins group. Unlike the above example, however, it may be desirable for this conflict to signal an error since it is not acceptable for a buyer to use his Admin spending limit for purchases outside the scope of the Admin function.

Values for the duplicate and DAG resolution strategy include max, min, intersection, union, bag, error, and most recent. Additional duplicate and DAG resolution strategies may be included in the process. The semantics of these are evident to those skilled in the art. For example, max takes the maximum of the conflicting rule values. Union returns a single instance of all conflicting values contributed by all applicable rules.

At step 540, rules engine conducts recursive evaluation. In one embodiment, a recursive evaluation is an evaluation starting at the lowest node of the hierarchy created after step 530 and recursively evaluating each parent until such continued evaluation reaches the root node or when each parent no longer requires recursive evaluation. An example of the latter situation is when the conflict resolution strategy for all parents is a "most specific" resolution strategy, meaning that further evaluation up the inheritance tree is not necessary.

At step 550, rules engine determines rule values. This rule value may be an aggregate rule value, a set of rule values, a pointer, a script, or other value. Using a discount example, the rule value may be an aggregate discount (15%), a set of discounts (5%, 10%, 15%), a pointer (a discount found at location http://computer/file), a script (5% if quantity ordered is less than 100, else 10%), or other value.

In one embodiment, the present invention may be implemented using object-oriented design patterns and an object oriented programming language. Accordingly, the sequence of acts implemented by the present invention may be modified without departing from the scope of the present invention. By way of specific example, the system may determine which analysis framework is applicable at any time after the context has been received.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

We claim:

1. A system for dynamically determining a set of relevant rule instances based on a set of context attribute values and a hierarchically organized rule data store, comprising:
   a directory server of rule instances having hierarchical structure;
   an attribute data store of said rule instances optimized to provide a set of hierarchically relevant context attribute values, based on the set of context attribute values; and
   a rules engine configured to provide the set of context attribute values to the attribute data store, and to determine a set of relevant rule instances, based on the hierarchically relevant context attribute values from the attribute data store, and to resolve conflicts between the set of relevant rule instances using directed acyclic graph(DAG) conflict resolution strategy comprising the steps:
   placing the set of relevant rule instances in a DAG based hierarchy based on a most significant role as determined by static role ordering wherein rule instances with identical role values will occupy an identical DAG node (multiple value node);
   for each DAG node having multiple values, forming the rule instances at that node repetitively according to a second most significant role until each DAG node possess either a single role value or multiple role values that are duplicates:
   for each DAG node having multiple duplicate values, forming a common child DAG node by applying duplicate resolution strategy;
   for each DAG having multiple parents, inserting a new parent DAG node creating a single child DAG node having a child DAG node value; and
   evaluating each parent DAG node beginning at the single DAG child node using recursive evaluation wherein recursive evaluation comprises combining parent DAG node values when there is more than one parent DAG node, and, when there is a single parent DAG node, combining a single parent DAG node value to the child DAG node value using inheritance resolution strategy.

2. The system of claim 1, wherein the hierarchically structured attribute data store comprises a lightweight database application protocol compliant directory server.

3. The system of claim 1, wherein the hierarchically structured attribute data store comprises a buyer data store, a seller data store, and an object data store.

4. The system of claim 3, wherein:
   the buyer data store is managed by a buyer organization;
   the seller data store is managed by a seller organization that is operationally independent from the buyer organization; and
   the object data store is managed by an object organization.

5. The system of claim 4, wherein buyer data store and the seller data store comprise information relating to a plurality of organizations, wherein each organization has a unique identifier within the system.

6. The system of claim 5, wherein the buyer data store and the seller data store further comprise information relating to a plurality of organization divisions, such that each organization division has a unique identifier within the system.

7. The system of claim 1, further comprising a context provider that comprises an electronic commerce application and provides a context comprising an application configuration parameter and the set of context attribute valves.

8. The system of claim 1, further comprising a compiler to provide optimized rule instances to said data store.

9. The system of claim 1, wherein the rules engine is configured to filter out a set of rules which have an attribute value that is not among the set of hierarchically relevant context attribute values.

10. The system of claim 9, wherein the rules engine is configured to filter out a set of rules which have an application configuration parameter that is different than an application configuration parameter of a received context.

11. A system for dynamically determining a set of relevant rule instances based on a set of context attribute values, comprising:
   means for having rule instances with hierarchical structure;
   means for having a hierarchical structure optimized to provide a set of hierarchically relevant context attribute values, based on the set of context attribute values; and
   means for providing the set of context attribute values to the attribute data store means, and to determine the set of relevant rule instances, based on the hierarchically relevant context attribute values from the attribute data store, and to resolve conflicts between the set of relevant rule instances using directed acyclic graph (DAG) conflict resolution strategy comprising the steps:
   placing the set of relevant rule instances in a DAG based hierarchy based on a most significant role as determined by static role ordering wherein rule instances with identical role values will occupy an identical DAG node (multiple value node);
   for each DAG node having multiple values, forming the rule instances at that node repetitively according to a second most significant role until each DAG node possess either a single role value or multiple role values that are duplicates;
   for each DAG node having multiple duplicate values, forming a common child DAG node applying duplicate resolution strategy;

for each DAG having multiple parents, inserting a new parent DAG node creating a single child DAG node having a child DAG node value; and evaluating each parent DAG node beginning at the single DAG child node using recursive evaluation wherein recursive evaluation comprises combining parent DAG node values when there is more than one parent DAG node, and, when there is a single parent DAG node, combining a single parent DAG node value to the child DAG node value using inheritance resolution strategy.

* * * * *